United States Patent
Kobayashi et al.

(10) Patent No.: US 8,269,598 B2
(45) Date of Patent: Sep. 18, 2012

(54) THERMISTOR DEVICE

(75) Inventors: Hirokazu Kobayashi, Tokyo (JP);
Takayuki Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 278 days.

(21) Appl. No.: 12/706,402

(22) Filed: Feb. 16, 2010

(65) Prior Publication Data

US 2010/0214054 A1    Aug. 26, 2010

(30) Foreign Application Priority Data

Feb. 20, 2009    (JP) .................. 2009-038315

(51) Int. Cl.
*H01C 7/10* (2006.01)

(52) U.S. Cl. ........ 338/22 R; 338/28; 338/314; 438/385; 374/208

(58) Field of Classification Search ............... 338/22 R, 338/20, 25, 28, 313, 314, 328, 224, 254; 438/385; 374/208, 185
See application file for complete search history.

(56) References Cited

U.S. PATENT DOCUMENTS

| | | | | |
|---|---|---|---|---|
| 4,712,085 A | * | 12/1987 | Miki et al. | 338/22 SD |
| 6,501,366 B2 | * | 12/2002 | Takahashi et al. | 338/25 |
| 6,899,457 B2 | * | 5/2005 | Kurano | 374/185 |
| 7,135,955 B2 | * | 11/2006 | Feichtinger et al. | 338/22 R |
| 7,215,236 B2 | * | 5/2007 | Rosc et al. | 338/314 |

FOREIGN PATENT DOCUMENTS

| | | |
|---|---|---|
| JP | 2006-054258 | 2/2006 |
| JP | 2007-180523 | 7/2007 |
| JP | 2008-306086 | 12/2008 |

* cited by examiner

*Primary Examiner* — Kyung Lee
(74) *Attorney, Agent, or Firm* — Muncy, Geissler, Olds & Lowe, PLLC (57) ABSTRACT

The present invention relates to a laminate thermistor device comprising a lead terminal 12 connected to a terminal electrode 10. A device main body 4 is a rectangular parallelepiped having mutually perpendicular first side 4a, second side 4b and third side 4c, and when a length of the first side is α, a length of the second side is β and a length of the third side is γ, the length of each side α, β and γ satisfies a relation of α≧β>γ. The terminal electrodes 10 are respectively formed on two plane surfaces including the first side 4a and second side 4b, and the lead terminals 12 are connected to the terminal electrodes 10 respectively to sandwich the third side 4c of the device main body 4 in a length direction therebetween.

17 Claims, 9 Drawing Sheets

THERMISTOR DEVICE

BACKGROUND OF THE INVENTION

1. Field of the Invention

The present invention relates to a thermistor device, further specifically, a thermistor device detectable of relatively high temperature.

2. Description of the Related Art

The mainstream of conventional thermistor devices for measuring the temperature of exhaust fume of an automobile, etc. has been those able to detect temperature up to 800° C. However recently, because of the increased demands for measuring the temperature of exhaust fume, etc. closer to an engine, it is desired to develop a thermistor device measurable of high temperature up to 1000° C.

As a high temperature heat-resistant type thermistor device, for example, as shown in Patent Document 1 (Japanese Unexamined Patent Publication No. 2007-180523), a thermistor device with improved heat-resistance is developed by devising a coating material covering around a main body of a device. However, the thermistor device shown in the Patent Document 1 is a single plate thermistor device without internal electrode layers, causing a problem that a surface of the device main body constituting a sensor portion is deteriorated by high heat to reduce sensor property.

Consequently, it is proposed that a laminate-type thermistor device is used for high-temperature applications, in which a surface of a device main body does not constitute a sensor portion, and an internal electrode layer and a thermistor layer are laminated. However, in conventional laminate-type thermistor devices, as shown in Patent Document 2 (the Japanese Unexamined Patent Publication No. 2007-180523), lead terminals are connected to both ends of the longest side in a device main body to result in an increase in distance between the lead terminals for the purpose of making an area of a laminated internal conductor layer as large as possible, etc.

When using such a conventional laminate-type thermistor device as a thermistor device for high-temperature applications at around 1000° C. without modification, the displacement of the device main body between the lead terminals may be increased due to heat expansion, and a crack may easily be caused in a device main body portion located at the center of the lead terminals (or insulating coating portion).

Also, in a laminate-type thermistor device in which a securing member is mounted in a lead terminal projecting from a device main body, the difference in heat expansion or heat contraction between the securing member and the device main body is increased, and it may cause stress in a direction to tear down the lead terminal from the device main body.

SUMMARY OF THE INVENTION

The present invention has been made in view of such a situation, and has a purpose to provide a thermistor device, able to stably work even at high temperature and to effectively prevent a crack of a device main body, etc.

To achieve the above purpose, a thermistor device according to the present invention comprises a device main body including internal electrode layers to sandwich a thermistor layer, a pair of terminal electrodes formed on the outer surface of said device main body and connected to said mutually facing internal electrode layers respectively, and lead terminals connected to said terminal electrodes respectively, wherein said device main body is a rectangular parallelepiped having mutually perpendicular first side, second side and third side; when a length of said first side is $\alpha$, a length of said second side is $\beta$ and a length of said third side is $\gamma$, each of said side length $\alpha$, $\beta$ and $\gamma$ satisfies a relation of $\alpha \geqq \beta > \gamma$; said terminal electrodes are respectively formed on two plane surfaces including said first side and second side; and said lead terminals are connected to said terminal electrodes respectively to sandwich a length direction of the third side of said device main body therebetween.

In the thermistor device according to the present invention, a sensor portion affecting sensor property is included within the device main body since the internal electrode layers are laminated to sandwich the thermistor layer therebetween in the device main body. Therefore, even when the surface of the device main body is affected by high heat, the sensor portion within the device main body is unaffected, and the sensor property is preferably kept. Namely, the thermistor device of the present invention has a structure hardly affected by environments such as temperature and atmosphere.

Also, the thermistor device according to the present invention, the lead terminals are connected to both ends of the shortest side, the third side, of the device main body, respectively. Namely, a pair of lead terminals sandwiches the shortest third side therebetween, so that the change in distance sandwiched by the lead terminals in the thermistor device due to heat expansion or heat contraction is minimized. Therefore, it is possible to effectively prevent a crack in the device main body.

Namely, the thermistor device of the present invention has a broad range of measured temperature, and improved reliability as a high temperature thermistor even under severe environments. Also, it is possible to downsize the thermistor device of the present invention in a direction such that the lead terminal is extended, and to make a case for housing the thermistor device thinner.

Preferably, said lead terminal is extended along a direction parallel to said first side. In this case, it is particularly possible to downsize in a direction such that the lead terminal is extended, and to make the case for housing the thermistor device thinner.

Preferably, a first metal is platinum (Pt), a second metal is at least one of palladium (Pd), rhodium (Rh) and iridium (Ir), and any one of said internal electrode layer and said terminal electrode includes the first metal and the second metal while the other includes the first metal and the second metal with a relatively low content of the second metal or only includes the first metal without the second metal.

In general, an end portion of the internal electrode layer exposed in a surface of the device main body tends to dent compared to the surface of the device main body, easily resulting in insufficient connection with the terminal electrode. The second metal such as palladium, rhodium and iridium is easily diffused in a connecting portion between the internal electrode layer and the terminal electrode, diffusing from high-concentration side to low-concentration side. Therefore, the internal electrode layer is favorably connected to the terminal electrode.

Preferably, a position to connect said lead terminal to said terminal electrode is out of alignment with a position to connect said internal electrode layer to said terminal electrode. By displacing in position of a temperature sensor for sensing (corresponding to the position of the internal electrode layer) from the position of the lead terminal which is easy to release heat, accuracy in response to temperature is improved.

Preferably, a float electrode not connected to said terminal electrode is laminated via said thermistor layer between said internal electrode layers respectively connected to said terminal electrodes in said device main body. By forming the float electrode, an area where the internal electrode layers are overlapped can be maintained substantially constant even when offset occurs in a pattern of the internal electrode layer, so that variations in thermistor properties can be reduced.

Preferably, at least a portion to connect said lead terminal to said terminal electrode is coated with an insulation layer. By coating with the insulation layer, it is possible to secure insulation to a metal case, and also to prevent deteriorating an external electrode by environments such as temperature and atmosphere.

Also, when coating the circumference of the device main body connected by the lead terminal with the insulation layer, stress is concentrated near a portion where the lead terminal is exposed from the insulating coating because of offset due to heat expansion or heat contraction, but in structure of the present invention, the stress can be reduced to contribute to preventing a crack in the device main body.

Preferably, said device main body includes Mn, Ca and Ti, and said insulation layer includes Mn and Ca without Ti. Such constitution allows co-firing of the thermistor device and the insulation layer, so that their heat expansion coefficients approach to improve reliability.

Preferably, a securing member of an insulation property for restricting a pair of said lead terminals from moving in mutually separating directions is mounted to said lead terminal protruding from said device main body. By mounting such a securing member, it is possible to avoid defect of leg split in a pair of lead terminals, and also to secure insulation between the metal case and the lead terminal.

Preferably, a width dimension of said securing member along a direction parallel to said third side is larger than a distance between said lead terminals. Also preferably, a width dimension of said securing member in a direction parallel to said second side is larger than the length β of said second side. By making the width of the securing member larger than the width of the device main body, it is possible to achieve insulation between the metal case and the device main body.

Said internal electrode layer and a longitudinal direction of the lead terminal may be in an approximately perpendicular relation, or in an approximately horizontal relation.

BRIEF DESCRIPTION OF THE DRAWINGS

Hereinafter, the present invention will be explained based on embodiments shown in the following drawings where.

DESCRIPTION OF THE PREFERRED EMBODIMENTS

First Embodiment

Hereinafter, the present invention will be explained based on the embodiments shown in the drawings.

Figure 1:
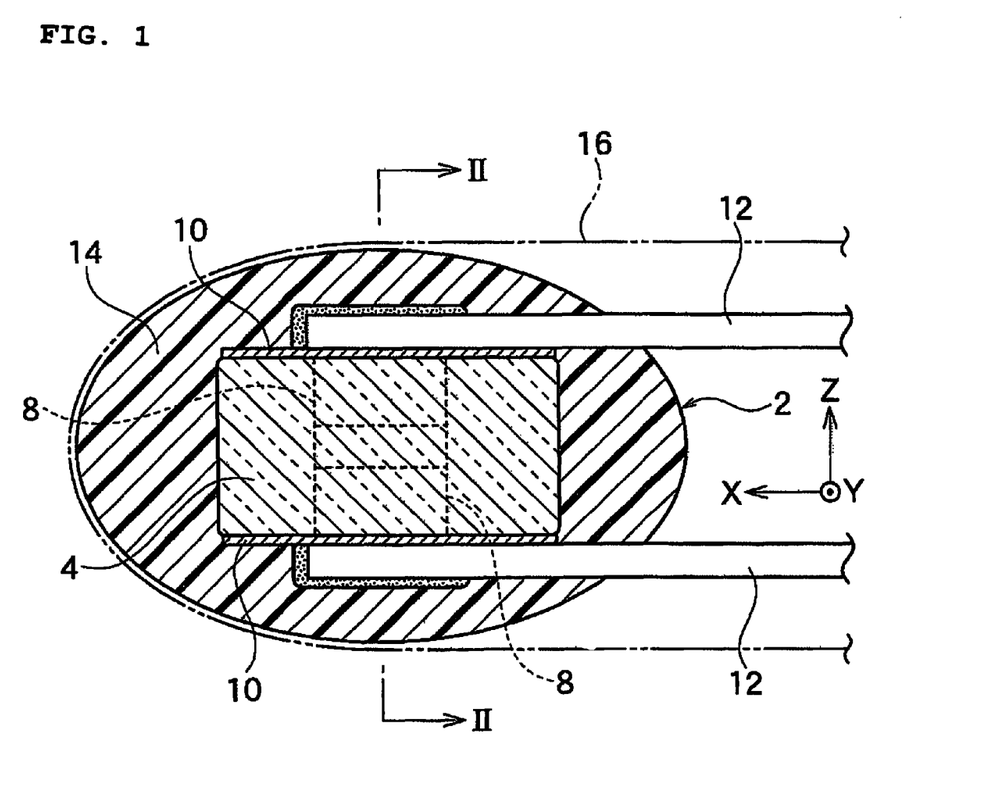
FIG. 1 is a vertical cross-sectional view of a key part of a thermistor device according to one embodiment of the present invention.
Figure 2:
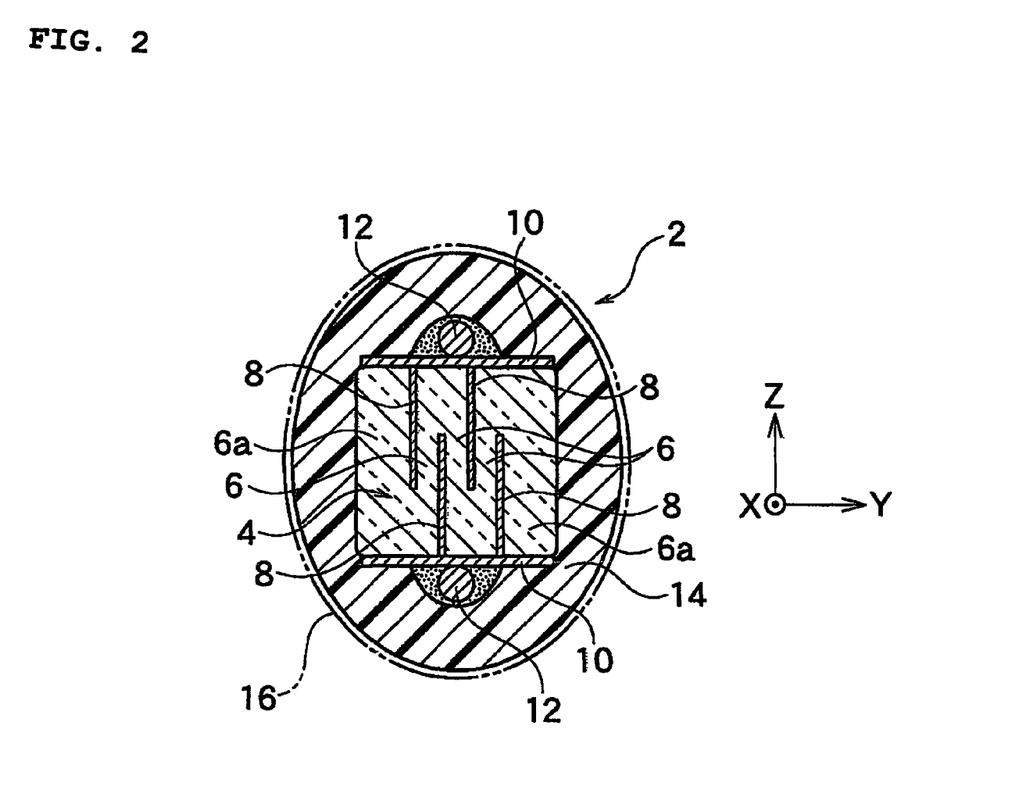
FIG. 2 is a transverse cross-sectional view of the thermistor device along the II-II line shown in FIG. 1.
Figure 3:
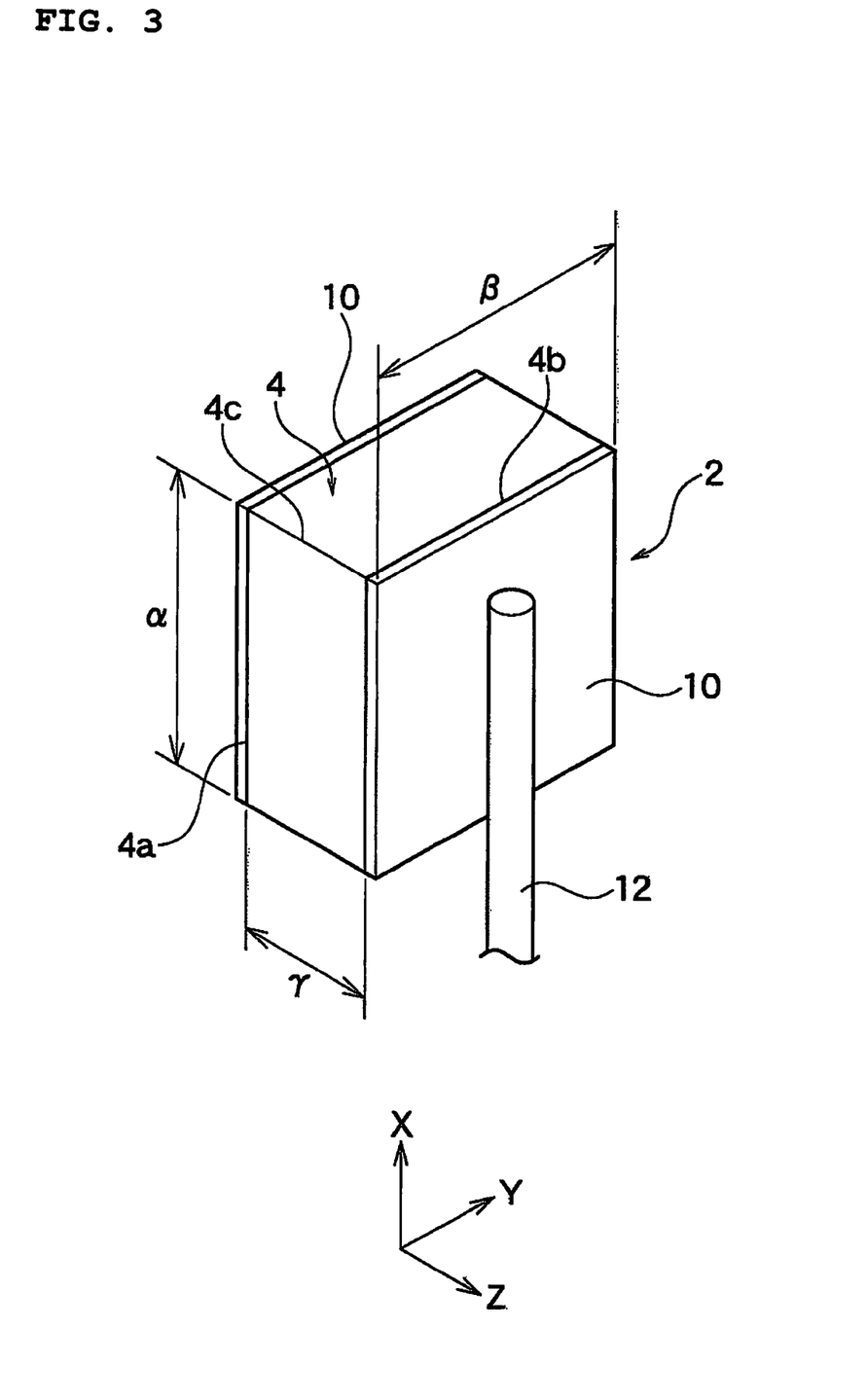
FIG. 3 is a perspective view of a key part of the thermistor device shown in FIG. 1.

As shown in FIG. 1 to FIG. 3, a laminate-type thermistor device 2 according to one embodiment of the present invention comprises a device main body 4, a pair of lead terminals 12 and an insulation layer 14.

As shown in FIG. 3, the device main body 4 is a rectangular parallelepiped having mutually perpendicular first side 4a, second side 4b and third side 4c. In the drawings, a direction parallel to the first side 4a of the device main body 4 is defined as an X axis, a direction parallel to the second side 4b is defined as a Y axis, and a direction parallel to the third side 4c of the device main body 4 is defined as a Z axis.

When the length of the first side 4a is $\alpha$, the length of the second side 4b is $\beta$, and the length of the third side 4c is $\gamma$, the lengths $\alpha$, $\beta$ and $\gamma$ of each side 4a, 4b and 4c satisfy a relation of $\alpha \geqq \beta > \gamma$, and terminal electrodes 10 are respectively formed on two plane surfaces including the first side 4a and the second side 4b of the device main body 4. Each terminal electrode 10 is formed on the whole surface of both end faces of the device main body 4 in the Z axis direction, but is not necessarily formed on the whole surface. The lengths $\alpha$, $\beta$ and $\gamma$ of respective sides 4a, 4b and 4c are not particularly limited, but preferably $\alpha=1.5 \times \gamma$ to $6.0 \times \gamma$, $\beta=1.5 \times 4.0 \times \gamma$ and $\gamma=0.3$ to $1.0$ mm.

An anterior end of each of the lead terminals 12 is connected to each of the terminal electrodes 10 with bonding paste or welding so as to sandwich both faces of the device main body 4 in the length direction of the third side 4c of the device main body 4 between a pair of lead terminals 12. A posterior end of each of the lead terminals 12 is extended along the X axis direction.

As shown in FIG. 1 and FIG. 2, internal electrode layers 8 are alternately laminated in the device main body 4 to sandwich a thermistor layer 6 with NTC properties therebetween. In this embodiment, the plane surface of the internal electrode layer 8 is in a direction parallel to the plane surface including the X axis and Z axis. One of the internal electrode layers 8 to sandwich the thermistor layer 6 is connected to one of the terminal electrodes 10 while the other internal electrode layer 8 is connected to the other terminal electrode 10, and the thermistor layer 6 sandwiched by the internal electrode layer 8 adjacent thereto in the laminated (Y axis) direction is a sensor portion.

As shown in FIG. 2, the internal electrode layers 8, alternately laminated via the thermistor layers 6, are respectively connected to a pair of terminal electrodes 10 formed on both end surfaces of the device main body 4 in the Z axis direction, and thermistor layers 6a not functioning as a sensor portion are laminated at both end portions in the laminated (Y axis) direction in the device main body 4.

The material of the thermistor layer 6 with NTC properties (including the thermistor layer 6a) is not particularly limited as far as it is semiconductor ceramics, and for example, it is constituted by a material containing an oxide of an element such as manganese (Mn), calcium (Ca) and titanium (Ti) as its main component. Also, a subcomponent may be included to improve the properties, etc. The constitution and content of the main component and subcomponent may be properly determined depending on the desired properties.

The thickness of the thermistor layer 6 is not particularly limited and is preferably 10 to 100 nm or so in the present embodiment. Also, the thickness of the thermistor layer 6a laminated outside is not particularly limited and is preferably 40 to 600 μm.

A conducting material to constitute the internal electrode layer 8 is not particularly limited, and it is, for example, constituted by noble metal such as Ag, Pd, Au and Pt and alloy thereof (e.g. Pt—Pd alloy), or base metal such as Cu and Ni and alloy thereof. In the present embodiment, the internal electrode layer 8 is preferably constituted by any one of Pt, Pt—Pd alloy, Pt—Rh alloy and Pt—Ir alloy. The thickness of the internal electrode layer 8 is preferably 0.5 to 2.0 μm.

The material of the terminal electrode 10 is not particularly limited, and the conducting material equivalent for those constituting the internal electrode layer 8 can be used. However, in the present embodiment, when the first metal is platinum (Pt) and the second metal is at least any one of palladium (Pd), rhodium (Rh) and iridium (Ir), either one of the internal electrode 8 or the terminal electrode 10 contains the first metal and the second metal while the other contains the first metal and a relatively low content of the second metal, or only contains the first metal without the second metal. For example, either one of the internal electrode 8 or the terminal electrode 10 is constituted by Pt—Pd alloy (Pt:Pd=80:20 in weight ratio), and the other is constituted by Pt—Pd alloy (Pt:Pd=90:10 in weight ratio) or Pt metal.

The terminal electrode 10 is, for example, formed by paste coating treatment, baking treatment, etc. The thickness of the terminal electrode 10 is not particularly limited, and is preferably 2 to 15 μm.

The lead terminal 12 is constituted by wire rod with circular cross section in the present embodiment, and the outer diameter of the wire rod is preferably 200 to 500 μm. However, the lead terminal 12 may have rectangular cross section, and its section size is preferably 0.1 to 0.4 mm×0.2 to 0.5 mm. In the present embodiment, the lead terminal 12 is constituted by the material equivalent for those constituting the terminal electrode 10, and is heat-resistant, and it is, for example, constituted by any one of Pt, Pt—Pd alloy, Pt—Rh alloy and Pt—Ir alloy.

As shown in FIG. 1 and FIG. 2, the circumference of the device main body 4 is coated with an ellipsoidal shaped insulation layer 14 so as to cover at least a portion where the anterior end of the lead terminal 12 is connected to terminal electrode 10, and to cover the whole circumference of the device main body 4, but to expose the posterior end portion of the lead terminal 12. Note that the insulation layer 14 is not indicated in FIG. 3.

The insulation layer 14 is constituted by an oxide containing Mn and Ca but no Ti when the thermistor layers 6 and 6a of the device main body 4 are constituted by an oxide of Mn, Ca, Ti, etc., and preferably has heat-resistance at around 1100° C.

Next, an example of a production method for the laminate-type thermistor 2 according to the present embodiment will be explained. A production method for the thermistor according to the present embodiment is not particularly limited and any publicly-known method may be used. In the following example, a sheet method is used.

First, a green sheet where a predetermined pattern of internal electrode layer paste film for forming the internal electrode layer 8 is formed on its surface is prepared as well as a green sheet without the internal electrode layer 8. The green sheet is formed by the material for constituting the above-mentioned NTC thermistor layer. Note that this kind of materials may include unavoidable impurities such as Si, K, Na and Ni in an amount of approximately 0.1 wt % or less.

Then, the green sheet is produced using such materials with publicly-known technology. Specifically, for example, raw materials for materials constituting the thermistor layer (e.g. commercially available manganese oxide, calcium carbonate, titanium oxide, etc.) are first uniformly mixed by means such as wet-mixing, followed by drying. Next, the dried mixture is calcined under the properly selected firing condition (preferably 1000 to 1200° C.), and the calcined powder is wet-pulverized. Then, pulverized calcined powder is added with binder, organic solvent, etc. to make it slurry. Next, the slurry is sheeted by means such as doctor blade method and screen printing method, followed by drying to obtain the green sheet.

The internal electrode layer paste includes the above-mentioned variety of metals. The internal electrode layer paste is coated on the green sheet by means such as printing method, so that the green sheet where a predetermined pattern of internal electrode layer paste film is formed can be obtained.

Next, these green sheets are layered, bonded with applied pressure, and cut after required processes such as drying process, and then, a device main body 4 in the green state is taken out. The cutting is performed with dicing saw, etc.

Next, the obtained device main body 4 in the green state is fired in a predetermined condition (preferably 1250 to 1450° C. or so), and then, on the fired body, an electrode paste including Pt such as Pt, Pt/Pd, Pt/Rh and Pt/Ir as its main component is formed as an external electrode by means such as transfer method. After that, it is dried and baked in a properly selected baking condition, preferably at 1050° C. to 1250° C. Next, to the terminal electrode 10, an anterior end portion of the lead terminal 12 is joined by jointing electrode paste, weld, etc. In case of weld, there may be resistance weld, arc weld, etc. When using the jointing electrode paste, an electrode paste including Pt such as Pt, Pt/Pd, Pt/Rh and Pt/Ir as main component is used as a material to join the anterior end portion of the lead terminal 12 to the terminal electrode 10. Then, it is dried and baked in a properly selected baking condition, preferably at 1050 to 1250° C., for baking the anterior end portion of the lead terminal 12 to the terminal electrode 10.

Next, the insulation layer 14 is formed. The insulation layer 14 is produced by using the above-mentioned raw materials of the ceramic materials to constitute the insulation layer 14 and preparing a paste by publicly-known technology. Specifically, as starting raw materials, commercially available manganese oxide, calcium carbonate, etc., are weighed and blended followed by wet-mixing by ball mill and Zr beads for a predetermined time. Then, the mixture of these raw materials are dehydrated and dried, followed by powder handling with mortar and pestle, etc. After that, it is calcined in a properly selected firing condition, preferably at 1050 to 1250° C., and the calcined powder is wet pulverized. The pulverized calcined powder is added with a binder, organic solvent, etc. to obtain a paste.

The obtained paste is coated by applying or dipping, etc., on a predetermined place of the device main body 4 where the anterior end portion of the lead terminal 12 is baked. Then, it is fired in a properly selected firing condition, preferably at 1050 to 1250° C., so that desired thermistor device 2 in which the insulation layer 14 is coated on the device main body 4 can be obtained.

According to the thermistor device 2 of the present embodiment, in the device main body 4, the internal electrode layers 8 are laminated to sandwich the thermistor layer 6 therebetween, so that the sensor portion affecting the sensor property is present within the device main body 4. Therefore, even when the surface of the device main body 4 is affected by high heat, the sensor portion in the device main body 4 is unaffected, resulting in good sensor property. Namely, the thermistor device 2 in the present embodiment has a structure hardly affected by environments such as temperature and atmosphere.

Also, in the thermistor device 2 according to the present embodiment, both ends of the shortest side of the device main body 4, i.e. third side 4c, are connected with the lead terminals 12 respectively. Namely, displacement in sandwiching distance of the lead terminal 12 is minimized due to heat expansion or heat contraction of the thermistor device 2 since a pair of the lead terminals 12 sandwich the shortest third side 4c therebetween. Therefore, crack of the device main body 4 can effectively be prevented.

Namely, the thermistor device 2 of the present embodiment is broad in measured temperature range, and can improve reliability as a high temperature thermistor even under severe environments. Also, since the lead terminal 12 extends in a direction parallel to the first side 4a in the thermistor device 2 of the present embodiment, the thermistor device 2 can be downsized in a direction that the lead terminal 12 extends, and the metal case 16 for housing the thermistor device 2 (see FIG. 1 and FIG. 2) can be made thin. Note that the metal case 16 is, for example, made of stainless steel.

Also, in the present embodiment, when the first metal is platinum (Pt), and the second metal is at least one of palladium (Pd), rhodium (Rh) and iridium (Ir), either one of the internal electrode layer 8 and the terminal electrode 10 contains the first metal and second metal, and the other contains the first metal and relatively low content of the second metal, or contains the first metal but no second metal.

In general, the end portion of the internal electrode layer 8 exposed on the surface of the device main body 4 tends to get dented with respect to the surface of the device main body 4, and the connection with the terminal electrode 10 may easily be insufficient. The second metal such as palladium, rhodium and iridium, particularly preferably palladium, is easy to diffuse in the connecting portion between the internal electrode layer 8 and the terminal electrode 10, and diffuses from high-concentration side to low-concentration side. Therefore, the internal electrode layer 8 and the terminal electrode 10 are favorably connected.

Further, in the present embodiment, the portion where the lead terminal 12 is connected to the terminal electrode 10 is at least coated by the insulation layer 14, and therefore, it is possible to ensure the insulation with the metal case 16 and to effectively prevent the terminal electrode 10 from deteriorating due to environments such as temperature and atmosphere.

Also, when the circumference of the device main body 4 where the lead terminal 12 is connected is coated with the insulation layer 14, stress is concentrated near the portion where the lead terminal 12 is exposed from the insulation layer 14 by displacement due to heat expansion or heat contraction, but it is possible in the structure of the present embodiment to reduce the stress, contributing to prevention of crack in the device main body 4.

Further in the present embodiment, the device main body 4 contains Mn, Ca and Ti, and the insulation layer 14 contains Mn and Ca without Ti, so that co-firing of the thermistor device 4 and the insulation layer 14 is possible and heat expansion coefficients are approximated to improve reliability.

Second Embodiments

Figure 4:
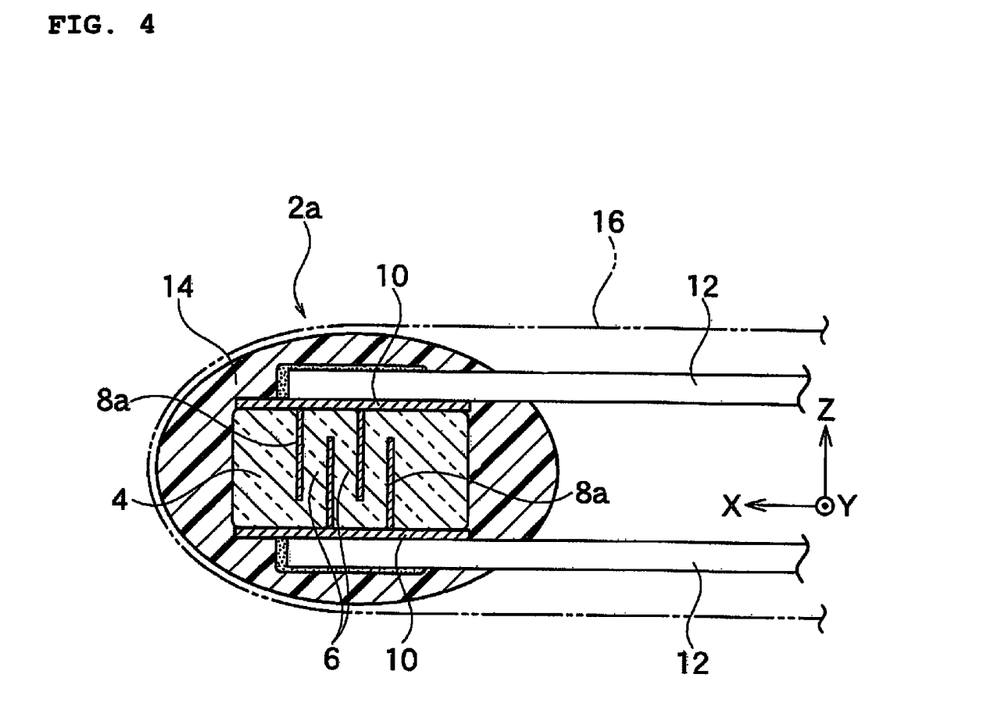
FIG. 4 is a vertical cross-sectional view of a thermistor device according to the other embodiment of the present invention.

A thermistor device 2a according to the present embodiment is, as shown in FIG. 4, equivalent to the thermistor device 2 according to the first embodiment except that each of internal electrode layers 8a has a face perpendicular to the X axis, and overlapping explanation will be omitted. The thermistor device 2a according to the present embodiment exhibits equivalent effects for those of the thermistor device 2 according to the first embodiment. In addition, in the present embodiment, the internal electrode layers 8a are laminated in the X axis direction of the device main body 4, and therefore it is possible to increase the number of the laminated internal electrode layers 8a compared to the first embodiment, and to expect improvement in the sensor property.

Third Embodiment

Figure 5:
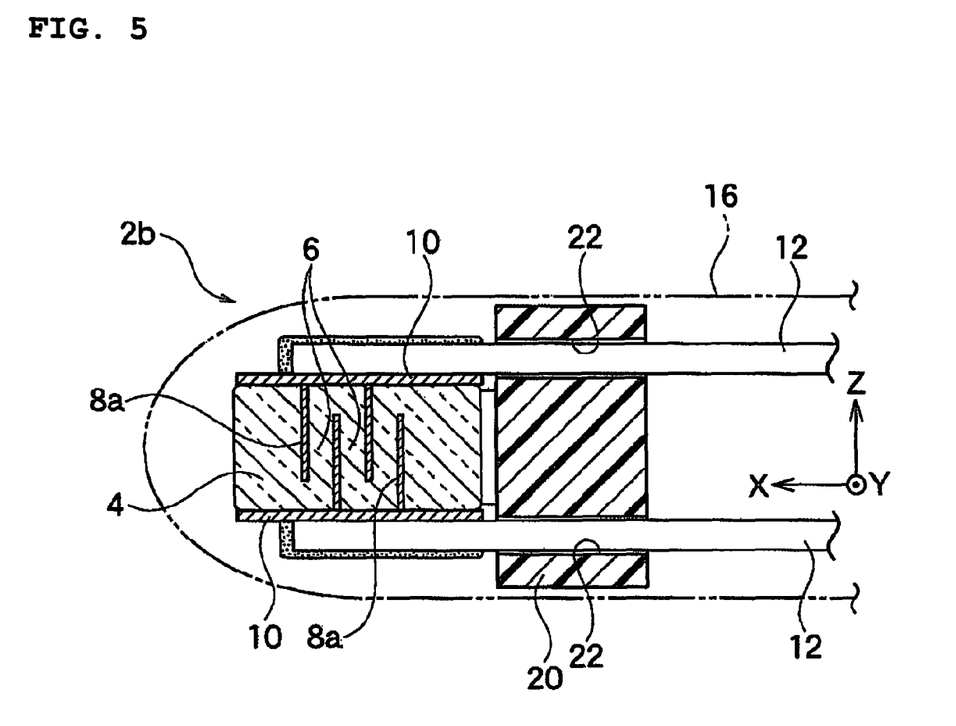
FIG. 5 is a vertical cross-sectional view of a thermistor device according to the other embodiment of the present invention.

A thermistor device 2b according to the present embodiment is, as shown in FIG. 5, equivalent to the thermistor device 2 according to the first embodiment except for making the face of each of internal electrode layers 8a perpendicular to the X axis, and constituting as follows without coating the device main body 4 with the insulation layer 14, so that overlapping explanation will be omitted.

In the third embodiment, a securing block (securing member) 20 with insulation property for restricting the movement of a pair of lead terminals 12 in mutually separating directions is mounted to the lead terminal 12 protruding from the device main body 4. The securing block 20 is constituted by, for example, a heat-resistant ceramic material with insulation property such as alumina and silica. The securing block 20 is formed with a through-hole 22 for inserting each of the lead terminals 12, and the lead terminal 12 penetrates the through-hole 22 of the securing block 20.

The pore diameter of the through-hole 22 is slightly larger than the outer diameter of the lead terminal 12, and is preferably about 20 to 100 μm larger (than the outer diameter of the lead terminal 12). The securing block 20 is arranged near the device main body 4, and fixed to the device main body 4 by applying a heat-resistance inorganic adhesive, etc. between the securing block 20 and the lead terminal 12 or device main body 4.

By mounting the securing block 20 to the device main body 4, a pair of lead terminals 12 can avoid defects such as leg split. Also, the width dimension of the securing block 20 in the Z axis direction is larger than the distance between the lead terminals 12, and the width dimension of the securing block 20 in the Y axis direction is larger than the width dimension of the device main body 4 in the Y axis direction (length β shown in FIG. 3), resulting in securing the insulation between the metal case 16 and the lead terminal 12.

Except for those mentioned above, the thermistor device 2b according to the present embodiment exhibits equivalent effects for those of the thermistor device 2a according to the second embodiment.

Fourth Embodiment

Figure 6:
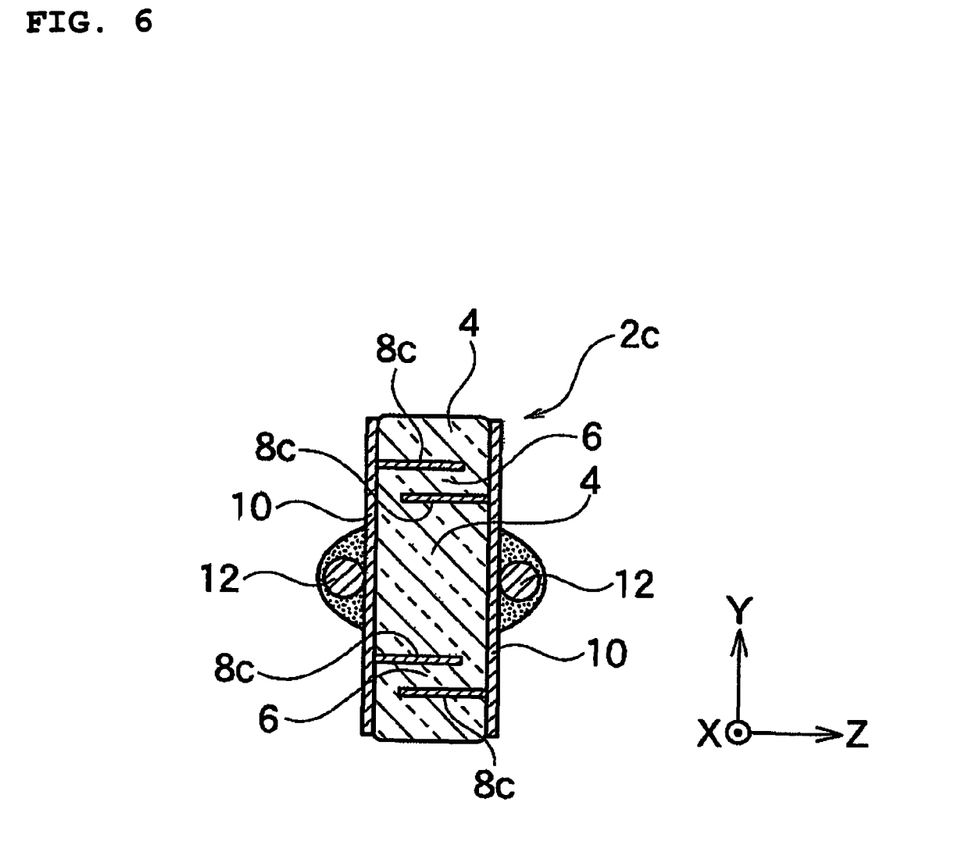
FIG. 6 is a transverse cross-sectional view of a thermistor device according to the other embodiment of the present invention.

A thermistor device 2c according to the present embodiment is, as shown in FIG. 6, equivalent to the thermistor device 2 according to the first embodiment except for constituting each of internal electrode layers 8c as below, so that overlapping explanation will be omitted. In the fourth embodiment, a position where a lead terminal 12 is connected to a terminal electrode 10 is displaced from a position where the internal electrode layer 8c is connected to a terminal electrode 10 in Y axis direction.

Namely, a connecting portion between the lead terminal 12 and the terminal electrode 10 is positioned at the center of a device main body 4 in the Y axis direction, and no internal electrode layer is provided in the center of the device main body 4 in the Y axis direction while more than a pair of internal electrode layers 8c are arranged in both end portions of the device main body 4 in the Y axis direction, respectively. Adjacent internal electrode layers 8c sandwiching a thermistor layer 6 therebetween are connected to mutually different terminal electrodes 10.

In the present embodiment, a temperature sensor (corresponding to the position of the internal electrode layer 8c) for sensing temperature is displaced with respect to the position of the exoergic lead terminal 12, so that accuracy in response to temperature is improved. Other effects are same as in the first embodiment.

Fifth Embodiment

Figure 7:
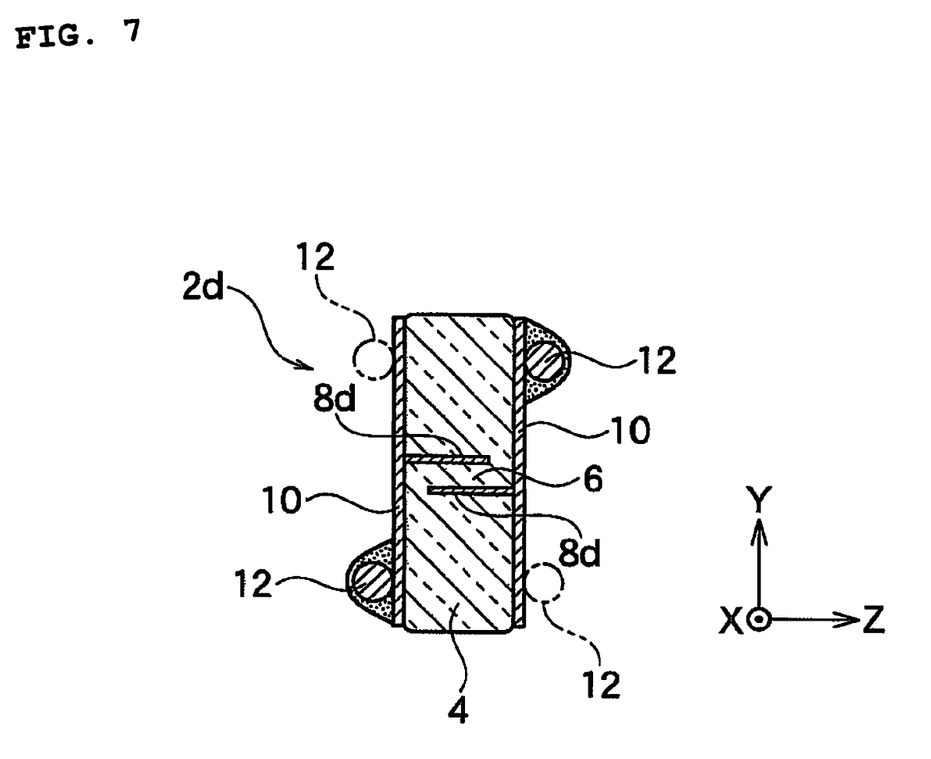
FIG. 7 is a transverse cross-sectional view of a thermistor device according to the other embodiment of the present invention.

A thermistor device 2d according to the present embodiment is, as shown in FIG. 7, equivalent to the thermistor device 2 according to the first embodiment except for constituting a lead terminal 12 and an internal electrode layer 8d as below, so that overlapping explanation will be omitted. In the fifth embodiment, a position where the lead terminal 12 is connected to a terminal electrode 10 is displaced with respect to a position where the internal electrode layer 8d is connected to the terminal electrode 10 in the Y axis direction.

Namely, a connecting portion between the lead terminal 12 and the terminal electrode 10 is positioned at both end portions of a device main body 4 in the Y axis direction, and no internal electrode layer is provided at both end portions of the device main body 4 in the Y axis direction while more than a pair of internal electrode layers 8d are arranged at the center of the device main body 4 in the Y axis direction. Adjacent internal electrode layers 8d sandwiching a thermistor layer 6 therebetween are connected to mutually different terminal electrodes 10. One lead terminal 12 may be connected to each of the terminal electrode, but it is preferable that two lead terminals 12 are connected to each of the terminal electrodes 10 to make symmetrical.

In the present embodiment, a temperature sensor (corresponding to the position of the internal electrode layer 8d) for sensing temperature is displaced with respect to the position of the exoergic lead terminal 12, so that accuracy in response to temperature is improved. Also particularly, in the present embodiment, the temperature sensor (corresponding to the position of the internal electrode layer 8d) for sensing temperature is positioned at the center of the Y axis direction compared to the embodiment shown in FIG. 6, and therefore, temperature sensor can further effectively be prevented from deterioration due to high heat. Other effects are same as in the first embodiment.

Sixth Embodiment

Figure 8:
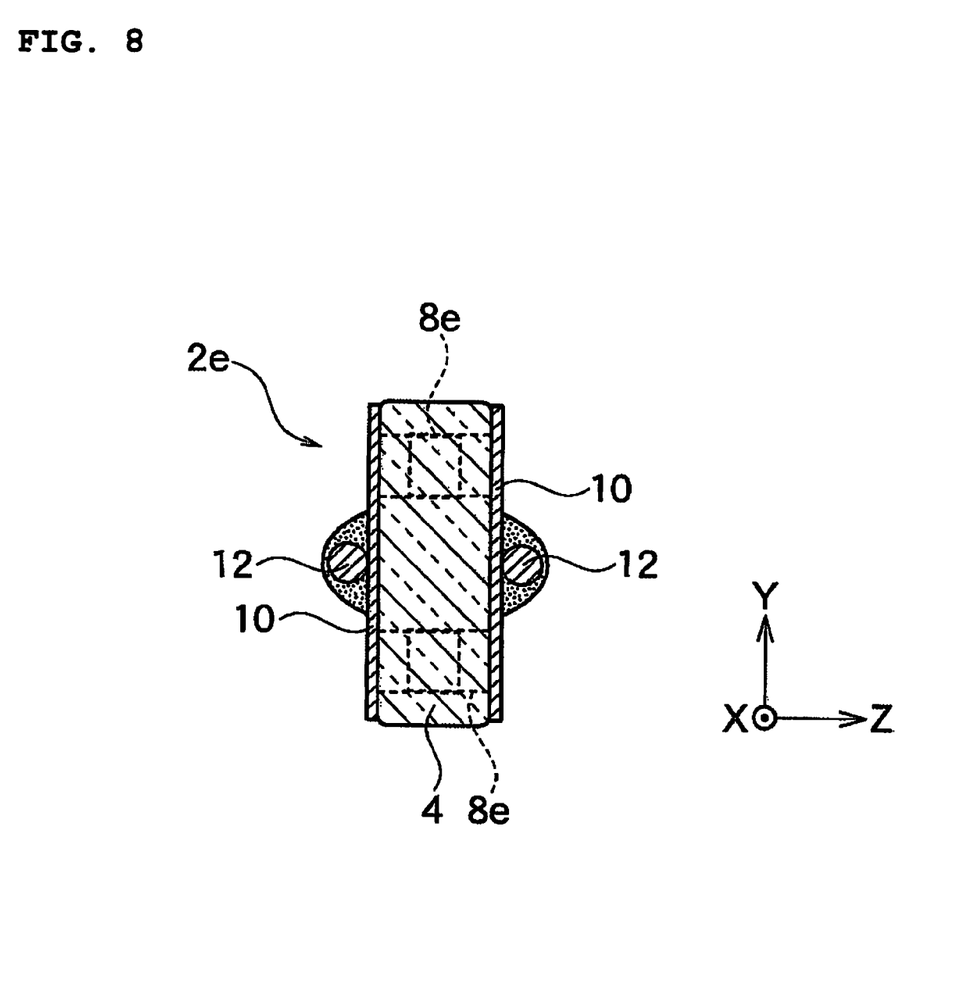
FIG. 8 is a transverse cross-sectional view of a thermistor device according to the other embodiment of the present invention.

A thermistor device 2e according to the present embodiment is, as shown in FIG. 8, equivalent to the thermistor device 2c according to the fourth embodiment shown in FIG. 6 except for constituting an internal electrode layer 8e as below, so that overlapping explanation will be omitted.

The sixth embodiment is same as in the fourth embodiment shown in FIG. 6 and exhibits equivalent effects except that the internal electrode layer 8e is arranged in a direction perpendicular to X axis. In this embodiment, because of laminating the internal electrode layers 8e in the X axis direction, the number of laminated internal electrode layers 8e can be increased compared to the fourth embodiment shown in FIG. 6.

Seventh Embodiment

Figure 9:
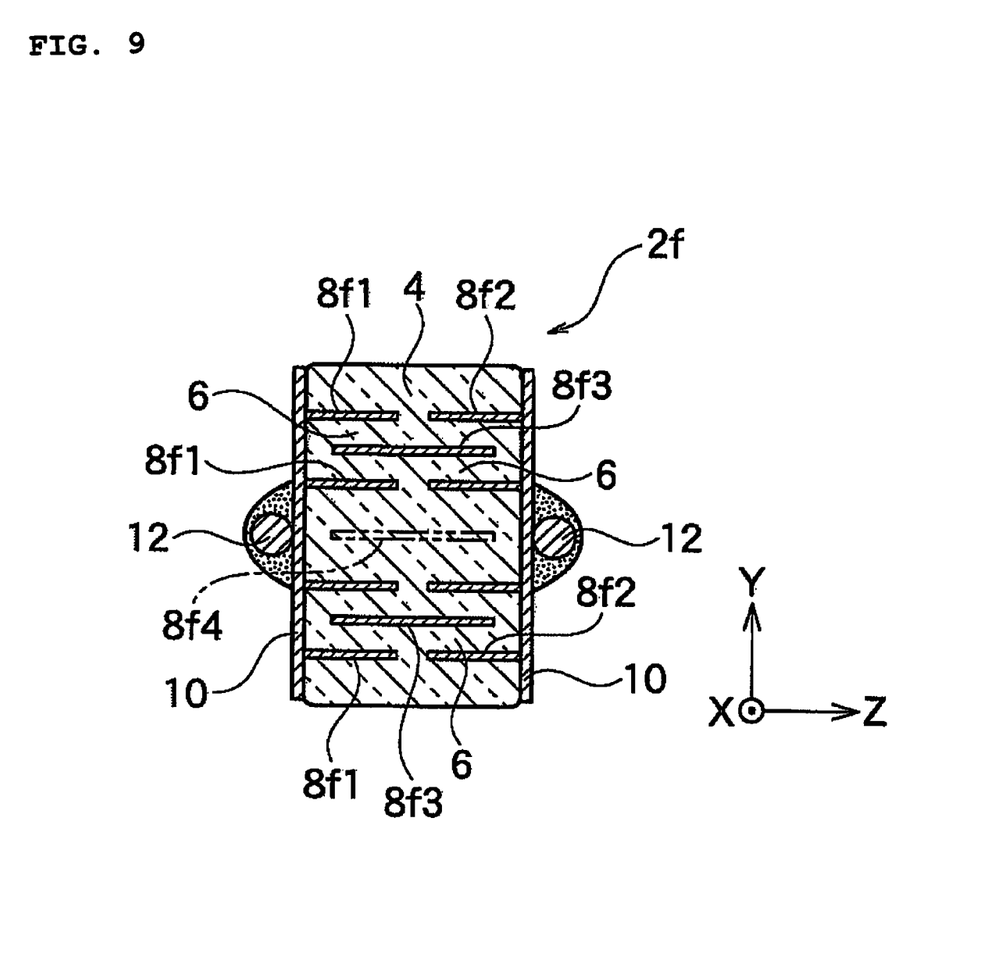
FIG. 9 is a transverse cross-sectional view of a thermistor device according to the other embodiment of the present invention.

A thermistor device 2f according to the present embodiment is, as shown in FIG. 9, equivalent to the thermistor device 2 according to the first embodiment except for constituting internal electrode layers 8/1 to 8/3 as below, so that overlapping explanation will be omitted. In this seventh embodiment, a position where a lead terminal 12 is connected to a terminal electrode 10 is displaced with respect to a position where the internal electrode layers 8/1 and 8/2 are connected to the terminal electrodes 10 in the Y axis direction.

Pairs of internal electrode layers 8/1 and 8/2 are respectively connected to mutually different terminal electrodes 10, formed on a plane surface including the Z axis and X axis, and arranged so as to be insulated in the Z axis direction. A single internal electrode layer 8/3 to be a float electrode (floating electrode) is arranged via a thermistor layer 6 between a pair of the internal electrode layers 8/1 and between a pair of the internal electrode layers 8/2, respectively arranged adjacently in the Y axis direction.

The internal electrode layer 8/3 to be the float electrode is not connected to any terminal electrode 10, and extended between the pair of internal electrode layers 8/1 and between the pair of internal electrode layers 8/2 along the X axis and Z axis directions. The width of the internal electrode layer 8/3 in the X axis direction is equivalent to those of the internal electrode layers 8/1 and 8/2.

In the present embodiment, by forming the internal electrode layer 8/3 to be the float electrode, the patterns of the internal electrode layers 8/1 and 8/2 are out of alignment in the Z axis direction, total overlapped area of the internal electrode layers 8/1 and 8/2 and the internal electrode layer 8/3 can be maintained approximately constant, so that variations of the thermistor properties can be reduced. Note that offset in the patterns of the internal electrode layers 8/1 and 8/2 in the Z axis direction is caused, for example, when cutting green chips of the device main body 4.

In the present embodiment, a temperature sensor (corresponding to the positions of the internal electrode layers 8/1 to 8/3) for sensing temperature is displaced with respect to the position of the exoergic lead terminal 12, as in the fourth embodiment shown in FIG. 6, so that accuracy in response to temperature is improved. Other effects are same as in the fourth embodiment shown in FIG. 6.

Note that in the embodiment shown in FIG. 9, the internal electrode layer 8/4 to be the float electrode may be arranged at the center of the device main body 4 in the Y axis direction. However, in this case, the center portion of the device main body 4 in the Y axis direction is also the temperature sensor, and displacement in position of the temperature sensor and lead terminal 12 is less advantageous.

Note that the present invention is not limited to the above-described embodiments, and can be variously modified within the range of the present invention.

The invention claimed is:

1. A thermistor device comprising a device main body including internal electrode layers to sandwich a thermistor layer, a pair of terminal electrodes formed on the outer surface of said device main body and connected to said mutually facing internal electrode layers respectively, and lead terminals connected to said terminal electrodes respectively, wherein:
said device main body is a rectangular parallelepiped having mutually perpendicular first side, second side and third side;
when a length of said first side is $\alpha$, a length of said second side is $\beta$ and a length of said third side is $\gamma$, each of said side length $\alpha$, $\beta$ and $\gamma$ satisfies a relation of $\alpha \geqq \beta > \gamma$;
said terminal electrodes are respectively formed on two plane surfaces including said first side and second side;
said lead terminals are connected to said terminal electrodes respectively to sandwich a length direction of the third side of said device main body therebetween; and
a position to connect said lead terminal to said terminal electrode is out of alignment with a position to connect said internal electrode layer to said terminal electrode.

2. The thermistor device as set forth in claim 1, wherein said lead terminal is extended along a direction parallel to said first side.

3. The thermistor device as set forth in claim 1 or 2, wherein:
a first metal is platinum, and a second metal is at least one of palladium, rhodium and iridium; and
any one of said internal electrode layer and said terminal electrode includes the first metal and second metal while the other includes the first metal and second metal with a relatively low content of the second metal or only includes the first metal without the second metal.

4. The thermistor device as set forth in claim 1 or 2, wherein a float electrode not connected to said terminal electrode is laminated via said thermistor layer between said internal electrode layers respectively connected to said terminal electrodes in said device main body.

5. The thermistor device as set forth in claim 1 or 2, wherein at least a portion to connect said lead terminal to said terminal electrode is coated with an insulation layer.

6. The thermistor device as set forth in claim 5, wherein said device main body includes Mn, Ca and Ti, and said insulation layer includes Mn and Ca without Ti.

7. The thermistor device as set forth in claim 1 or 2, wherein a securing member of an insulation property for restricting a pair of said lead terminals from moving in mutually separating directions is mounted to said lead terminal protruding from said device main body.

8. The thermistor device as set forth in claim 7, wherein a width dimension of said securing member along a direction parallel to said third side is larger than a distance between said lead terminals.

9. The thermistor device as set forth in claim 8, wherein a width dimension of said securing member in a direction parallel to said second side is larger than the length $\beta$ of said second side.

10. A thermistor device comprising a device main body including internal electrode layers to sandwich a thermistor layer, a pair of terminal electrodes formed on the outer surface of said device main body and connected to said mutually facing internal electrode layers respectively, and lead terminals connected to said terminal electrodes respectively, wherein:
said device main body is a rectangular parallelepiped having mutually perpendicular first side, second side and third side;
when a length of said first side is $\alpha$, a length of said second side is $\beta$ and a length of said third side is $\gamma$, each of said side length $\alpha$, $\beta$ and $\gamma$ satisfies a relation of $\alpha \geqq \beta > \gamma$;
said terminal electrodes are respectively formed on two plane surfaces including said first side and second side;
said lead terminals are connected to said terminal electrodes respectively to sandwich a length direction of the third side of said device main body therebetween; and
any one of said internal electrode layers and said terminal electrode includes a first metal and a second metal while the other includes the first metal and the second metal with a relatively low content of the second metal or only includes the first metal without the second metal, where the first metal is platinum, and the second metal is at least one of palladium, rhodium and iridium.

11. The thermistor device as set forth in claim 10, wherein said lead terminal is extended along a direction parallel to said first side.

12. The thermistor device as set forth in claim 10 or 11, wherein a float electrode not connected to said terminal electrode is laminated via said thermistor layer between said internal electrode layers respectively connected to said terminal electrodes in said device main body.

13. The thermistor device as set forth in claim 10 or 11, wherein at least a portion to connect said lead terminal to said terminal electrode is coated with an insulation layer.

14. The thermistor device as set forth in claim 13, wherein said device main body includes Mn, Ca and Ti, and said insulation layer includes Mn and Ca without Ti.

15. The thermistor device as set forth in claim 10 or 11, wherein a securing member of an insulation property for restricting a pair of said lead terminals from moving in mutually separating directions is mounted to said lead terminal protruding from said device main body.

16. The thermistor device as set forth in claim 15, wherein a width dimension of said securing member along a direction parallel to said third side is larger than a distance between said lead terminals.

17. The thermistor device as set forth in claim 16, wherein a width dimension of said securing member in a direction parallel to said second side is larger than the length $\beta$ of said second side.

* * * * *